United States Patent
Ho et al.

(10) Patent No.: US 8,831,433 B2
(45) Date of Patent: Sep. 9, 2014

(54) TEMPERATURE CONTROLLED MULTI-CHANNEL TRANSMITTER OPTICAL SUBASSEMBLY AND OPTICAL TRANSCEIVER MODULE INCLUDING SAME

(71) Applicant: Applied Optoelectronics, Inc., Sugar Land, TX (US)

(72) Inventors: I-Lung Ho, Sugar Land, TX (US); Luohan Peng, Cypress, TX (US); Justin Lii, Houston, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 88 days.

(21) Appl. No.: 13/708,064

(22) Filed: Dec. 7, 2012

(65) Prior Publication Data

US 2014/0161455 A1    Jun. 12, 2014

(51) Int. Cl.
 *H04B 10/00* (2013.01)
 *H04J 14/00* (2006.01)
 *H04J 14/02* (2006.01)

(52) U.S. Cl.
 CPC .................................. *H04J 14/0278* (2013.01)
 USPC ............... 398/138; 398/68; 398/72; 398/139; 398/158; 398/164

(58) Field of Classification Search
 CPC ........... H04B 10/2503; H04B 10/2507; H04B 10/25758; H04J 14/0215; H04J 14/0216; H04J 14/0217; H04J 14/0278; H04J 2014/02; H04J 2014/0242
 USPC ............ 398/67, 68, 70–72, 79, 139, 141, 158
 See application file for complete search history.

(56) References Cited

U.S. PATENT DOCUMENTS

| 4,786,132 A | 11/1988 | Gordon |
| 5,042,898 A | 8/1991 | Morey et al. |

(Continued)

FOREIGN PATENT DOCUMENTS

| JP | 2000174397 A | 6/2000 |
| KR | 20000049869 A | 8/2000 |

(Continued)

OTHER PUBLICATIONS

PCT International Search Report and Written Opinion dated Oct. 22, 2012 received in corresponding PCT Application No. PCT/US2012/046912, 8 pgs.

(Continued)

*Primary Examiner* — Dalzid Singh
(74) *Attorney, Agent, or Firm* — Grossman Tucker Perreault & Pfleger, PLLC; Norman S. Kinsella

(57) ABSTRACT

A temperature controlled multi-channel transmitter optical subassembly (TOSA) may be used in a multi-channel optical transceiver. The multi-channel TOSA generally includes an array of lasers optically coupled to an arrayed waveguide grating (AWG) to combine multiple optical signals at different channel wavelengths. A temperature control system may be used to control the temperature of both the array of lasers and the AWG with the same temperature control device, e.g., a thermoelectric cooler (TEC). The multi-channel optical transceiver may also include a multi-channel receiver optical subassembly (ROSA). The optical transceiver may be used in a wavelength division multiplexed (WDM) optical system, for example, in an optical line terminal (OLT) in a WDM passive optical network (PON).

20 Claims, 3 Drawing Sheets

(56) References Cited

U.S. PATENT DOCUMENTS

| | | | |
|---|---|---|---|
| 5,499,256 A | 3/1996 | Bischel et al. | |
| 5,732,102 A | 3/1998 | Bouadma | |
| 5,757,828 A | 5/1998 | Ouchi | |
| 5,937,120 A | 8/1999 | Higashi | |
| 5,987,200 A | 11/1999 | Fleming et al. | |
| 6,111,999 A | 8/2000 | Espindola et al. | |
| 6,118,562 A * | 9/2000 | Lee et al. | 398/1 |
| 6,188,705 B1 | 2/2001 | Krainak et al. | |
| 6,275,629 B1 | 8/2001 | Eggleton et al. | |
| 6,303,040 B1 | 10/2001 | Oh et al. | |
| 6,411,746 B1 | 6/2002 | Chamberlain et al. | |
| 6,480,513 B1 | 11/2002 | Kapany et al. | |
| 6,683,895 B2 | 1/2004 | Pilgrim et al. | |
| 6,741,629 B1 | 5/2004 | Garnache et al. | |
| 6,853,671 B2 | 2/2005 | Liu et al. | |
| 6,917,636 B2 | 7/2005 | Blauvelt et al. | |
| 6,920,159 B2 | 7/2005 | Sidorin et al. | |
| 7,027,469 B2 | 4/2006 | Sidorin et al. | |
| 7,324,719 B2 * | 1/2008 | Kish, Jr. et al. | 385/14 |
| 7,327,957 B2 * | 2/2008 | Lee et al. | 398/82 |
| 7,899,105 B1 | 3/2011 | Hargis et al. | |
| 7,965,949 B1 | 6/2011 | Wach | |
| 2001/0017960 A1 | 8/2001 | Terahara | |
| 2006/0153566 A1 * | 7/2006 | Sorin et al. | 398/72 |
| 2006/0177225 A1 * | 8/2006 | Paraschis et al. | 398/87 |
| 2006/0215713 A1 | 9/2006 | Flanders et al. | |
| 2007/0133647 A1 | 6/2007 | Daiber | |
| 2007/0223552 A1 | 9/2007 | Muendel et al. | |
| 2008/0259972 A1 | 10/2008 | Heanue et al. | |
| 2008/0267246 A1 | 10/2008 | Volodin et al. | |
| 2009/0185586 A1 | 7/2009 | Jhung et al. | |
| 2010/0208756 A1 | 8/2010 | Noh | |
| 2010/0232458 A1 | 9/2010 | Kim et al. | |
| 2010/0266283 A1 | 10/2010 | Beckett | |
| 2011/0135309 A1 | 6/2011 | Lee et al. | |
| 2013/0279862 A1 * | 10/2013 | Ishii et al. | 385/92 |

FOREIGN PATENT DOCUMENTS

| | | |
|---|---|---|
| KR | 20000051030 A | 8/2000 |
| WO | 03012936 A2 | 2/2003 |

OTHER PUBLICATIONS

Lee, San-Liang et al., "Trend and Applications of Tunable Semiconductor Lasers", Optoelectronic Materials and Devices II, Proc. of SPIE vol. 6782, 67821H, 2007, Taipei, Taiwan R.O.C., 10 pgs.

Palmer, Christopher, "Diffraction Gratings—The Crucial Dispersive Component", The Baseline, reprinted from Spectroscopy, vol. 10, No. 2, Feb. 1995, pp. 14-15.

* cited by examiner

TEMPERATURE CONTROLLED MULTI-CHANNEL TRANSMITTER OPTICAL SUBASSEMBLY AND OPTICAL TRANSCEIVER MODULE INCLUDING SAME

TECHNICAL FIELD

The present disclosure relates to multi-channel optical transmitters or transceivers and more particularly, to a temperature controlled multi-channel transmitter optical subassembly (TOSA).

BACKGROUND INFORMATION

Optical communications networks, at one time, were generally "point to point" type networks including a transmitter and a receiver connected by an optical fiber. Such networks are relatively easy to construct but deploy many fibers to connect multiple users. As the number of subscribers connected to the network increases and the fiber count increases rapidly, deploying and managing many fibers becomes complex and expensive.

A passive optical network (PON) addresses this problem by using a single "trunk" fiber from a transmitting end of the network, such as an optical line terminal (OLT), to a remote branching point, which may be up to 20 km or more. One challenge in developing such a PON is utilizing the capacity in the trunk fiber efficiently in order to transmit the maximum possible amount of information on the trunk fiber. Fiber optic communications networks may increase the amount of information carried on a single optical fiber by multiplexing different optical signals on different wavelengths using wavelength division multiplexing (WDM). In a WDM-PON, for example, the single trunk fiber carries optical signals at multiple channel wavelengths to and from the optical branching point and the branching point provides a simple routing function by directing signals of different wavelengths to and from individual subscribers. In this case, each subscriber may be assigned one or more of the channel wavelengths on which to send and/or receive data.

To transmit and receive optical signals over multiple channel wavelengths, the OLT in a WDM-PON may include a multi-channel transmitter optical subassembly (TOSA) and a multi-channel receiver optical subassembly (ROSA). One example of a TOSA includes an array of lasers optically coupled to an arrayed waveguide grating (AWG) to combine multiple optical signals at multiple channel wavelengths. The desired accuracy or precision of the wavelengths in a WDM-PON often depends on the number and spacing of the channel wavelengths and may be controlled in the TOSA by controlling temperature. OLT transceiver modules often are designed to fit a relatively small form factor. One challenge with such OLT transceiver modules is providing temperature control of the laser array and AWG in a relatively small space and with relatively low power consumption.

BRIEF DESCRIPTION OF THE DRAWINGS

These and other features and advantages will be better understood by reading the following detailed description, taken together with the drawings wherein.

DETAILED DESCRIPTION

A temperature controlled multi-channel transmitter optical subassembly (TOSA), consistent with embodiments described herein, may be used in a multi-channel optical transceiver. The multi-channel TOSA generally includes an array of lasers optically coupled to an arrayed waveguide grating (AWG) to combine multiple optical signals at different channel wavelengths. A temperature control system may be used to control the temperature of both the array of lasers and the AWG with the same temperature control device, e.g., a thermoelectric cooler (TEC). The multi-channel optical transceiver may also include a multi-channel receiver optical subassembly (ROSA). The optical transceiver may be used in a wavelength division multiplexed (WDM) optical system, for example, in an optical line terminal (OLT) in a WDM passive optical network (PON).

As used herein, "channel wavelengths" refer to the wavelengths associated with optical channels and may include a specified wavelength band around a center wavelength. In one example, the channel wavelengths may be defined by an International Telecommunication (ITU) standard such as the ITU-T dense wavelength division multiplexing (DWDM) grid. The term "coupled" as used herein refers to any connection, coupling, link or the like and "optically coupled" refers to coupling such that light from one element is imparted to another element. Such "coupled" devices are not necessarily directly connected to one another and may be separated by intermediate components or devices that may manipulate or modify such signals. As used herein, "thermally coupled" refers to a direct or indirect connection or contact between two components resulting in heat being conducted from one component to the other component.

Figure 1:
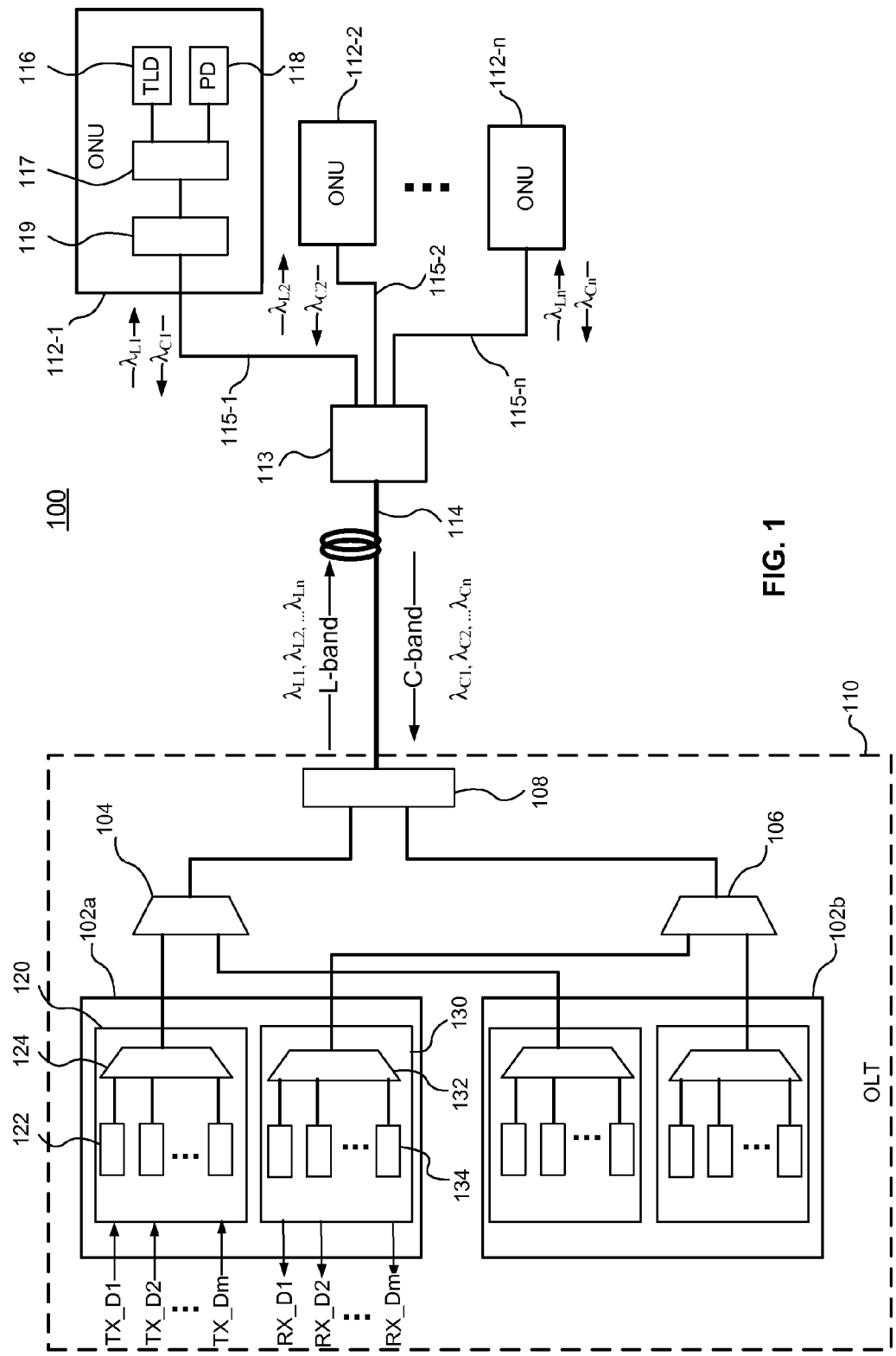
FIG. 1 is a functional block diagram of a wavelength division multiplexed (WDM) passive optical network (PON) including at least one multi-channel optical transceiver, consistent with embodiments of the present disclosure.

Referring to FIG. 1, a WDM-PON 100 including one or more multi-channel optical transceivers 102*a*, 102*b*, consistent with embodiments of the present disclosure, is shown and described. The WDM-PON 100 provides a point-to-multi-point optical network architecture using a WDM system. According to one embodiment of the WDM-PON 100, at least one optical line terminal (OLT) 110 may be coupled to a plurality of optical networking terminals (ONTs) or optical networking units (ONUs) 112-1 to 112-*n* via optical fibers, waveguides, and/or paths 114, 115-1 to 115-*n*. Although the OLT 110 includes two multi-channel optical transceivers 102*a*, 102*b* in the illustrated embodiment, the OLT 110 may include one or more multi-channel optical transceivers.

The OLT 110 may be located at a central office of the WDM-PON 100, and the ONUs 112-1 to 112-*n* may be located in homes, businesses or other types of subscriber location or premises. A branching point 113 (e.g., a remote node) couples a trunk optical path 114 to the separate optical paths 115-1 to 115-*n* to the ONUs 112-1 to 112-*n* at the respective subscriber locations. The branching point 113 may include one or more passive coupling devices such as a splitter or optical multiplexer/demultiplexer. In one example, the ONUs 112-1 to 112-n may be located about 20 km or less from the OLT 110.

The WDM-PON 100 may also include additional nodes or network devices, such as Ethernet PON (EPON) or Gigabit PON (GPON) nodes or devices, coupled between the branching point 113 and ONUs 112-1 to 112-n at different locations or premises. One application of the WDM-PON 100 is to provide fiber-to-the-home (FTTH) or fiber-to-the-premises (FTTP) capable of delivering voice, data, and/or video services across a common platform. In this application, the central office may be coupled to one or more sources or networks providing the voice, data and/or video.

In the WDM-PON 100, different ONUs 112-1 to 112-n may be assigned different channel wavelengths for transmitting and receiving optical signals. In one embodiment, the WDM-PON 100 may use different wavelength bands for transmission of downstream and upstream optical signals relative to the OLT 110 to avoid interference between the received signal and back reflected transmission signal on the same fiber. For example, the L-band (e.g., about 1565 to 1625 nm) may be used for downstream transmissions from the OLT 110 and the C-band (e.g., about 1530 to 1565 nm) may be used for upstream transmissions to the OLT 110. The upstream and/or downstream channel wavelengths may generally correspond to the ITU grid. In one example, the upstream wavelengths may be aligned with the 100 GHz ITU grid and the downstream wavelengths may be slightly offset from the 100 GHz ITU grid.

The ONUs 112-1 to 112-n may thus be assigned different channel wavelengths within the L-band and within the C-band. Transceivers or receivers located within the ONUs 112-1 to 112-n may be configured to receive an optical signal on at least one channel wavelength in the L-band (e.g. $\lambda_{L1}$, $\lambda_{L2}$, ... $\lambda_{Ln}$). Transceivers or transmitters located within the ONUs 112-1 to 112-n may be configured to transmit an optical signal on at least one channel wavelength in the C-band (e.g., $\lambda_{C1}$, $\lambda_{C2}$, ... $\lambda_{Cn}$). Other wavelengths and wavelength bands are also within the scope of the system and method described herein.

The branching point 113 may demultiplex a downstream WDM optical signal (e.g., $\lambda_{L1}, \lambda_{L2}, \ldots \lambda_{Ln}$) from the OLT 110 for transmission of the separate channel wavelengths to the respective ONUs 112-1 to 112-n. Alternatively, the branching point 113 may provide the downstream WDM optical signal to each of the ONUs 112-1 to 112-n and each of the ONUs 112-1 to 112-n separates and processes the assigned optical channel wavelength. The individual optical signals may be encrypted to prevent eavesdropping on optical channels not assigned to a particular ONU. The branching point 113 also combines or multiplexes the upstream optical signals from the respective ONUs 112-1 to 112-n for transmission as an upstream WDM optical signal (e.g., $\lambda_{C1}, \lambda_{C2}, \ldots \lambda_{Cn}$) over the trunk optical path 114 to the OLT 110.

One embodiment of the ONU 112-1 includes a laser 116, such as a laser diode, for transmitting an optical signal at the assigned upstream channel wavelength ($\lambda_{C1}$) and a photodetector 118, such as a photodiode, for receiving an optical signal at the assigned downstream channel wavelength ($\lambda_{L1}$). The laser 116 may include a tunable laser configured to be tuned to the assigned channel wavelength. This embodiment of the ONU 112-1 may also include a diplexer 117 coupled to the laser 116 and the photodetector 118 and a C+L band filter 119 coupled to the diplexer 117, which allow the L-band channel wavelength ($\lambda_{L1}$) to be received by the ONU 112-1 and the C-band channel wavelength ($\lambda_{C1}$) to be transmitted by the ONU 112-1.

The OLT 110 may be configured to generate multiple optical signals at different channel wavelengths (e.g., $\lambda_{L1}$, $\lambda_{L2}$, ... $\lambda_{Ln}$) and to combine the optical signals into the downstream WDM optical signal carried on the trunk optical fiber or path 114. Each of the OLT multi-channel optical transceivers 102a, 102b may include a multi-channel transmitter optical subassembly (TOSA) 120 for generating and combining the optical signals at the multiple channel wavelengths. The OLT 110 may also be configured to separate optical signals at different channel wavelengths (e.g., $\lambda_{C1}$, $\lambda_{C2}$, ... $\lambda_{Cn}$) from an upstream WDM optical signal carried on the trunk path 114 and to receive the separated optical signals. Each of the OLT multi-channel optical transceivers 102a, 102b may thus include a multi-channel receiver optical subassembly (ROSA) 130 for separating and receiving the optical signals at multiple channel wavelengths.

One embodiment of the multi-channel TOSA 120 includes an array of lasers 122, such as laser diodes, which may be modulated by respective RF data signals (TX_D1 to TX_Dm) to generate the respective optical signals. The lasers 122 may be modulated using various modulation techniques including external modulation and direct modulation. An optical multiplexer 124, such as an arrayed waveguide grating (AWG), combines the optical signals at the different respective downstream channel wavelengths (e.g., $\lambda_{L1}, \lambda_{L2}, \ldots \lambda_{Lm}$). The TOSA 120 may also include a temperature control system for controlling temperature of both the lasers 122 and the multiplexer 124 to maintain a desired wavelength precision or accuracy, as described in greater detail below.

In some embodiments, the lasers 122 may be tunable lasers that generate the optical signals at the respective channel wavelengths. In other embodiments, the lasers 122 may generate optical signals over a band of channel wavelengths and filtering and/or multiplexing techniques may be used to produce the assigned channel wavelengths. Examples of optical transmitters including a laser array and AWG are disclosed in greater detail in U.S. patent application Ser. No. 13/543,310 (U.S. Patent Application Pub. No. 20130016971), U.S. patent application Ser. No. 13/357,130 (U.S. Patent Application Pub. No. 20130016977), and U.S. patent application Ser. No. 13/595,505 (U.S. Patent Application Pub. No. 20130223844, all of which are fully incorporated herein by reference. In the illustrated embodiment, the OLT 110 further includes a multiplexer 104 for multiplexing the multiplexed optical signal from the multi-channel TOSA 120 in the multi-channel transceiver 102a with a multiplexed optical signal from a multi-channel TOSA in the other multi-channel transceiver 102b to produce the downstream aggregate WDM optical signal.

One embodiment of the multi-channel ROSA 130 includes a demultiplexer 132 for separating the respective upstream channel wavelengths (e.g., $\lambda_{C1}, \lambda_{C2}, \ldots \lambda_{Cn}$). An array of photodetectors 134, such as photodiodes, detects the optical signals at the respective separated upstream channel wavelengths and provides the received data signals (RX_D1 to RX_Dm). In the illustrated embodiment, the OLT 110 further includes a demultiplexer 106 for demultiplexing the upstream WDM optical signal into first and second WDM optical signals provided to the respective multi-channel ROSA in each of the transceivers 102a, 102b. The OLT 110 also includes a diplexer 108 between the trunk path 114 and the multiplexer 104 and the demultiplexer 106 such that the trunk path 114 carries both the upstream and the downstream channel wavelengths. The transceivers 102a, 102b may also include other components, such as laser drivers, transimpedance amplifiers (TIAs), and control interfaces, used for transmitting and receiving optical signals.

In one example, each of the multi-channel optical transceivers 102a, 102b may be configured to transmit and receive 16 channels such that the WDM-PON 100 supports 32 downstream L-band channel wavelengths and 32 upstream C-band channel wavelengths. In one example, the downstream L-band link between the OLT transceivers 102a, 102b and the ONUs 112-1 to 112-n may support a power budget of at least about 26 dB and the upstream C-band link between the ONUs 112-1 to 112-n and the OLT transceivers 102a, 102b may support a power budget of at least about 23 dB. One example of the WDM-PON 100 may operate at 1.25 Gbaud using 8B/10B encoded on-off keying as the modulation scheme. Other data rates and modulation schemes may also be used.

As mentioned above, the upstream and downstream channel wavelengths may span a range of channel wavelengths on the 100 GHz ITU grid. Each of the transceivers 102a, 102b, for example, may cover 16 channel wavelengths in the L-band for the TOSA and 16 channel wavelengths in the C-band for the ROSA such that the transceivers 102a, 102b together cover 32 channels. Thus, the multiplexer 104 may combine 16 channels from one transceiver 102a with 16 channels from the other transceiver 102b, and the demultiplexer 106 may separate a 32 channel WDM optical signal into two 16 channel WDM optical signals. To facilitate use of the multiplexer 104 and the demultiplexer 106, the range of channel wavelengths may skip channels (e.g., 2 channels) in the middle of the range. According to one example of a multi-channel optical transceiver used in the WDM-PON 100, the desired wavelength precision or accuracy is ±0.05 nm, the desired operating temperature is between −5 and 70° C., and the desired power dissipation is about 16.0 W.

Figure 2:
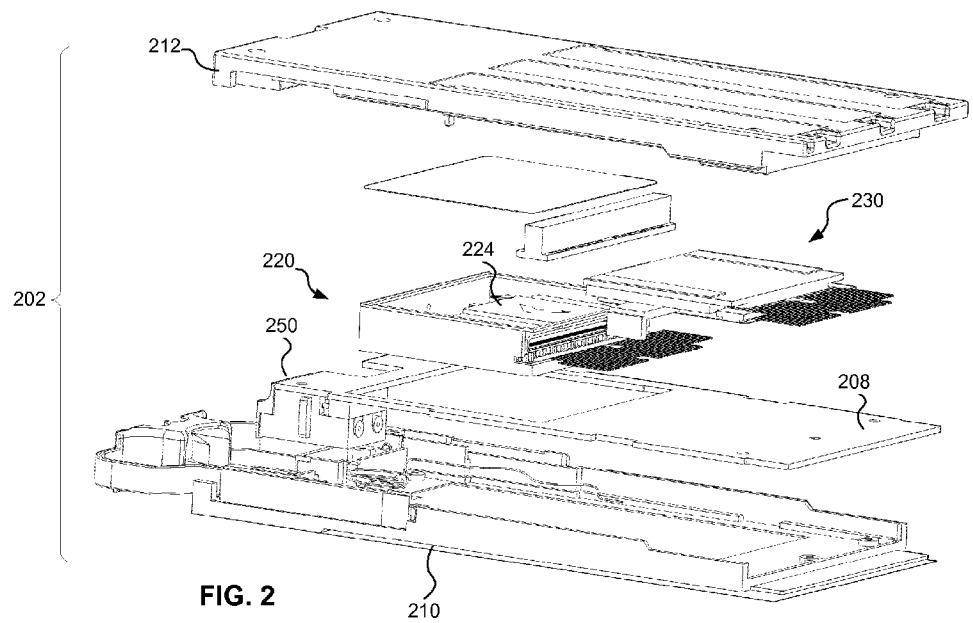
FIG. 2 is an exploded view of a multi-channel optical transceiver including a temperature controlled multi-channel TOSA, consistent with an embodiment of the present disclosure.
Figure 3:
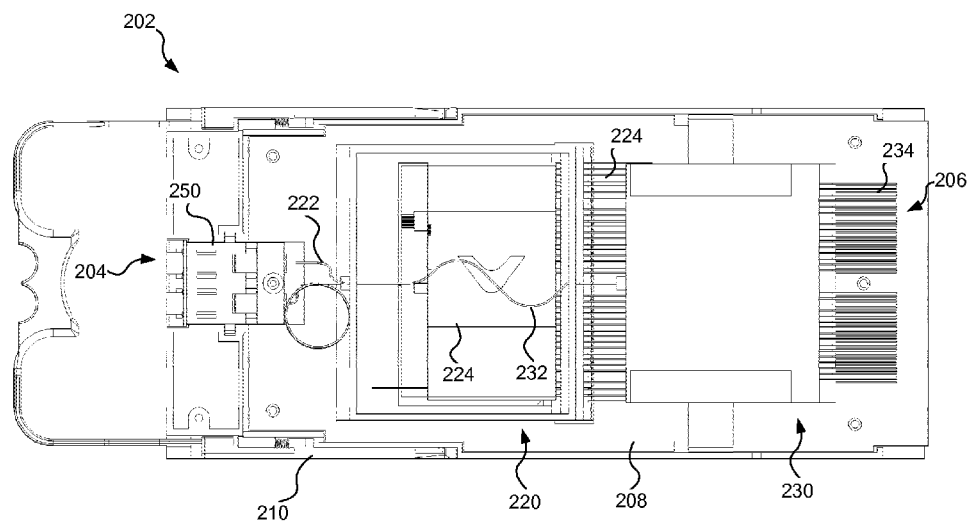
FIG. 3 is a top view inside the multi-channel optical transceiver shown in FIG. 2.

Referring to FIGS. 2 and 3, one embodiment of a multi-channel optical transceiver module 202 including a temperature controlled multi-channel TOSA 220 is shown and described in greater detail. As discussed above, multiple multi-channel transceiver modules may be used in an OLT of a WDM-PON to cover a desired channel range. The transceiver module 202 and the multi-channel TOSA 220 within the transceiver module 202 may thus be designed to have a relatively small form factor with minimal space. The multi-channel optical transceiver module 202 generally provides an optical input and output at one end 204 and electrical input and output at another end 206. The transceiver module 202 includes a transceiver housing 210 containing the temperature controlled multi-channel TOSA 220, a multi-channel ROSA 230, and a dual fiber type direct link adapter 250 directly linked to the TOSA 220 and the ROSA 230 for providing the optical input and output.

The dual fiber type direct link adapter 250 is coupled to the TOSA 220 and to the ROSA 230 with respective optical fibers 222, 232 to provide the direct link between the adapter 250 and both the TOSA 220 and the ROSA 230. The dual fiber type direct link adapter 250 is also configured to receive pluggable optical connectors, such as LC connectors (not shown), to connect the TOSA 220 and ROSA 230, respectively, to fiber optic cables (not shown). When the pluggable optical connectors are plugged into the dual fiber type direct link adapter 250, the adapter 250 establishes an optical coupling between the TOSA 220 and the ROSA 230 and the respective optical fibers in the fiber-optic cables, which carry the optical signals to and from the transceiver.

The temperature controlled multi-channel TOSA 220 includes an array of lasers (not shown in FIGS. 2 and 3) coupled to an AWG 224. A temperature control system, as will be described in greater detail below, controls the temperature of both the laser array and the AWG 224 using the same temperature control device. In one example, the temperature is maintained in a range between −5 and 70° C. to maintain a wavelength precision or accuracy of about ±0.05 nm.

The transceiver module 202 may also include one or more printed circuit boards 208 coupled to the TOSA 220 and/or ROSA 230. The printed circuit board(s) 208 may include electronic components such as laser drivers, transimpedance amplifiers (TIAs), and control interfaces. The TOSA 220 is coupled to conductive leads 224 for carrying the electronic signals including the data to be transmitted by the TOSA 220. The ROSA 230 is coupled to the conductive leads 234 for carrying the electronic signals including the data received by the ROSA 230.

A top housing portion 212 encloses the TOSA 220, the ROSA 230, the adapter 250, the optical fibers 222, 232, and other components within the housing 210. The transceiver housing 210 may have a width of less than about 55 mm, a length of less than about 130 mm, and a height of less than about 10 mm. More specifically, one example of a transceiver housing 210 may have a width of 54.6 mm, a length of 110 mm, and a height of about 9.8 mm. Within the transceiver module 202, the thermally isolated multi-channel TOSA 220 has a width, a height and length capable of fitting within the transceiver housing 210.

Figure 4:
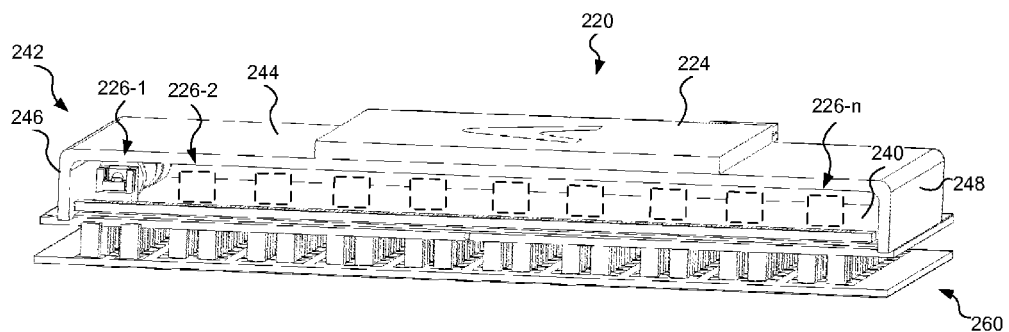
FIG. 4 is a perspective view of one embodiment of a temperature controlled multi-channel TOSA.
Figure 5:
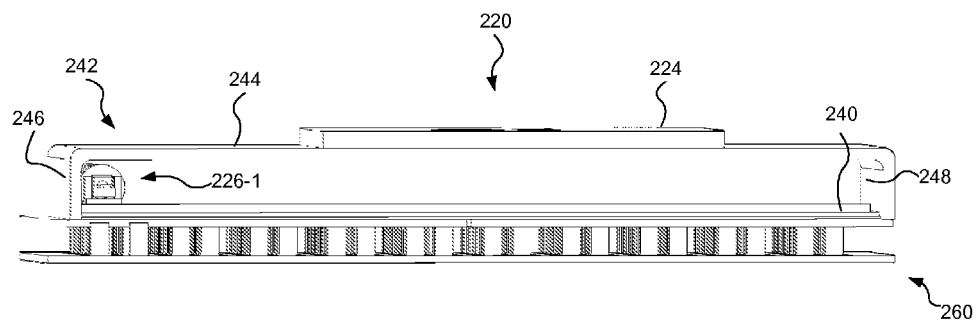
FIG. 5 is another perspective view of the temperature controlled multi-channel TOSA shown in FIG. 4.
Figure 6:
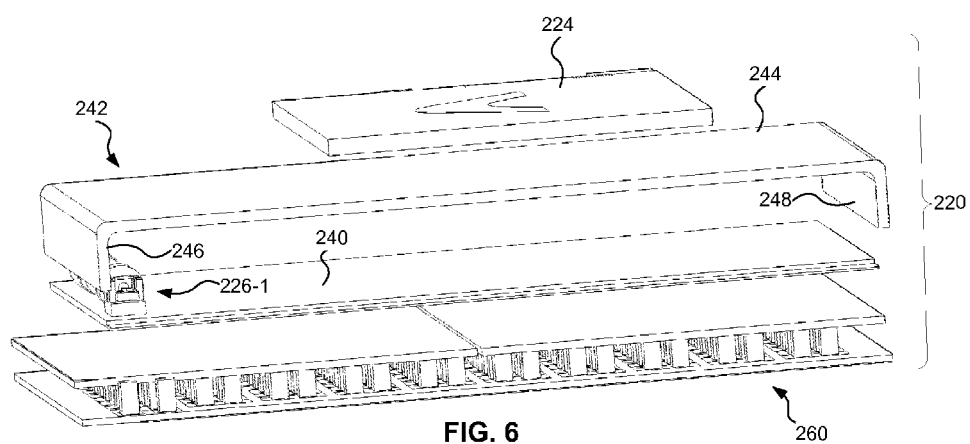
FIG. 6 is an exploded perspective view of the temperature controlled multi-channel TOSA shown in FIG. 4.

Referring to FIGS. 4-6, an embodiment of the temperature controlled multi-channel TOSA 220 is described in greater detail. This embodiment of the temperature controlled multi-channel TOSA 220 includes an array of lasers 226-1 to 226-n (only laser 226-1 is shown in detail) optically coupled to the AWG 224. The lasers 226-1 to 226-n may be optically coupled to the AWG 224, for example, using low bending loss optical fibers (not shown). Each laser 226-1 may be provided as a laser package including, but not limited to, a laser diode chip mounted on a laser mounting structure. The laser package may also include optical components, such as a lens for optically coupling the laser light into a respective one of the optical fibers, and/or optoelectronic components, such as a monitor photodiode. The AWG 224 may include an AWG chip such as the type used for WDM, Coarse WDM (CWDM), or Dense (DWDM) multiplexing or demultiplexing.

The array of lasers 226-1 to 226-n are supported on a laser array tray 240 and the AWG is supported on an AWG tray 242. Both the laser array tray 240 and the AWG tray 242 are thermally coupled to the same temperature control device 260 such that the temperature control device 260, the laser array tray 240 and the AWG tray 242 provide a temperature control system for the TOSA within a relatively small space. The temperature control device 260 may be a thermoelectric cooler, such as a Peltier device, for cooling the array of lasers 226-1 to 226-n and the AWG 224. In this embodiment, the AWG tray 242 supports the AWG 224 above the lasers 226-1 to 226-n. By using the same temperature control device and supporting the AWG 224 above the lasers 226-1 to 226-n, the desired temperature range can be maintained with relatively low power consumption and within a relatively small space.

In the illustrated embodiment, the AWG tray 242 includes a supporting portion 244 that supports the AWG 224 and side portions 246, 248 that hold the supporting portion 244 above the lasers 226-1 to 226-n. The laser array tray 240 may be a relatively flat plate that fits between the side portions 246, 248 such that both the laser array tray 240 and the side portions 246, 248 of the AWG tray 242 are separately thermally coupled to the temperature control device 260 (e.g., to the cold side of a TEC). The laser array tray 240 and the side portions 246, 248 of the AWG tray 242 may each directly contact the temperature control device 260 or may be thermally coupled through another thermally conductive material. Because a larger surface area of the laser array tray 240 is thermally coupled to the temperature control device 260, the temperature of the lasers 226-1 to 226-n may be controlled more precisely. Although the illustrated embodiment shows a particular shape for the trays 240, 242, other shapes may also be used to support the lasers 226-1 to 226-n and the AWG 224 and to provide thermal coupling to the same temperature control device 260. Each of the trays 240, 242 may also be formed as one piece or multiple pieces.

Both of the trays 240, 242 may be made of a thermally conductive material having a thermal conductivity greater than 60 W/(m·K) and more specifically greater than 80 W/(m·K). The trays 240, 242 may be made, for example of copper or zinc. At least a portion of the trays 240, 242 may also be gold plated, for example, to facilitate soldering to the trays 240, 242. In one example, the laser array tray 240 is made of AlN with a thermal conductivity of about 170 W/(m·K) and the AWG tray 242 is made of copper with Au plating and having a thermal conductivity of greater than 300 W/(m·K).

Accordingly, a temperature controlled multi-channel TOSA, consistent with embodiments described herein, allows the temperature of both the lasers and the AWG to be controlled with the same temperature control device. Thus, the multi-channel TOSA may provide precise channel wavelengths by controlling temperature with relatively low power consumption and in a relatively small space.

Consistent with an embodiment, a multi-channel transceiver module includes a transceiver housing and a temperature controlled multi-channel transmitter optical subassembly (TOSA) located in the transceiver housing. The TOSA is configured to transmit a wavelength division multiplexed (WDM) optical signal on multiple channel wavelengths. The TOSA includes an array of lasers configured to generate laser light, wherein each of the lasers are associated with different respective optical channels, an arrayed waveguide grating (AWG) optically coupled to the array of lasers and configured to combine the laser light at different respective channel wavelengths, and a temperature control system configured to control temperature of both the array of lasers and the AWG with a same temperature control device. The multi-channel transceiver module also includes a multi-channel receiver optical subassembly (ROSA) located in the transceiver housing, the ROSA being configured to receive a wavelength division multiplexed (WDM) optical signal on multiple channel wavelengths.

Consistent with another embodiment, a temperature-controlled multi-channel transmitter optical subassembly (TOSA) includes an array of lasers configured to generate laser light, wherein each of the lasers are associated with different respective optical channels and an arrayed waveguide grating (AWG) optically coupled to the array of lasers and configured to combine the laser light at different respective channel wavelengths. The temperature-controlled multi-channel TOSA also includes a temperature control device, a laser array tray supporting the lasers and thermally coupled to the temperature control device, and an AWG tray supporting the AWG and thermally coupled to the temperature control device.

Consistent with a further embodiment, an optical line terminal includes at least first and second multi-channel transceivers. Each of the multi-channel transceivers includes a transceiver housing and a multi-channel transmitter optical subassembly (TOSA) located in the transceiver housing, the TOSA being configured to transmit a wavelength division multiplexed (WDM) optical signal on multiple channel wavelengths. The TOSA includes an array of lasers configured to generate laser light, wherein each of the lasers are associated with different respective optical channels, an arrayed waveguide grating (AWG) optically coupled to the array of lasers and configured to combine the laser light at different respective channel wavelengths, and a temperature control system configured to control temperature of both the array of lasers and the AWG with a same temperature control device. Each multi-channel transceiver also includes a multi-channel receiver optical subassembly (ROSA) located in the transceiver housing, the ROSA being configured to receive a wavelength division multiplexed (WDM) optical signal on multiple channel wavelengths.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A multi-channel transceiver module comprising:
    a transceiver housing;
    a temperature controlled multi-channel transmitter optical subassembly (TOSA) located in the transceiver housing, the TOSA being configured to transmit a wavelength division multiplexed (WDM) optical signal on multiple channel wavelengths, the TOSA comprising:
        an array of lasers configured to generate laser light, wherein each of the lasers are associated with different respective optical channels;
        an arrayed waveguide grating (AWG) optically coupled to the array of lasers and configured to combine the laser light at different respective channel wavelengths; and
        a temperature control system configured to control temperature of both the array of lasers and the AWG with a same temperature control device; and
    a multi-channel receiver optical subassembly (ROSA) located in the transceiver housing, the ROSA being configured to receive a wavelength division multiplexed (WDM) optical signal on multiple channel wavelengths.

2. The multi-channel transceiver module of claim 1 wherein the AWG is supported above the array of lasers in the TOSA.

3. The multi-channel transceiver module of claim 1 wherein the temperature control system comprises:
    a laser array tray supporting the array of lasers and thermally coupled to the temperature control device; and
    an AWG tray supporting the AWG and thermally coupled to the temperature control device.

4. The multi-channel transceiver module of claim 1 wherein the temperature control system comprises a thermoelectric cooler as the same temperature control device.

5. The multi-channel transceiver module of claim 3 wherein the AWG tray supports the AWG above the array of lasers and the laser array tray.

6. The multi-channel transceiver module of claim 5 wherein the AWG tray includes a supporting portion and side portions extending from the supporting portion to contact the temperature control device, wherein the side portions hold the supporting portion above the array of lasers.

7. The multi-channel transceiver module of claim 6 wherein the temperature control system comprises a thermoelectric cooler as the same temperature control device, wherein the laser array tray contacts the thermoelectric cooler and wherein the side portions of the AWG tray contact the thermoelectric cooler.

8. The multi-channel transceiver module of claim 3 wherein the laser array tray is made of a material having a thermal conductivity greater than 60 W/(m·K), and wherein the AWG tray is made of a material having a thermal conductivity greater than 60 W/(m·K).

9. The multi-channel transceiver module of claim 3 wherein the laser array tray is made of copper or zinc, and wherein the AWG tray is made of copper or zinc.

10. The multi-channel transceiver module of claim 9 wherein the laser tray is gold plated.

11. A temperature-controlled multi-channel transmitter optical subassembly (TOSA) comprising:
   an array of lasers configured to generate laser light, wherein each of the lasers are associated with different respective optical channels;
   an arrayed waveguide grating (AWG) optically coupled to the array of lasers and configured to combine the laser light at different respective channel wavelengths;
   a temperature control device;
   a laser array tray supporting the lasers and thermally coupled to the temperature control device; and
   an AWG tray supporting the AWG and thermally coupled to the temperature control device.

12. The temperature-controlled multi-channel TOSA of claim 11, wherein the temperature control device is a thermoelectric cooler.

13. The temperature-controlled multi-channel TOSA of claim 11 wherein the AWG tray supports the AWG above the array of lasers and the laser array tray.

14. The temperature-controlled multi-channel TOSA of claim 13 wherein the AWG tray includes a supporting portion and side portions extending from the supporting portion to contact the temperature control device, wherein the side portions hold the supporting portion above the array of lasers.

15. The temperature-controlled multi-channel TOSA of claim 11 wherein the laser array tray is made of a material having a thermal conductivity greater than 60 W/(m·K), and wherein the AWG tray is made of a material having a thermal conductivity greater than 60 W/(m·K).

16. The temperature-controlled multi-channel TOSA of claim 11 wherein the laser array tray is made of copper or zinc, and wherein the AWG tray is made of copper or zinc.

17. An optical line terminal comprising:
   at least first and second multi-channel transceivers, each of the multi-channel transceivers comprising:
      a transceiver housing;
      a multi-channel transmitter optical subassembly (TOSA) located in the transceiver housing, the TOSA being configured to transmit a wavelength division multiplexed (WDM) optical signal on multiple channel wavelengths, the TOSA comprising:
         an array of lasers configured to generate laser light, wherein each of the lasers are associated with different respective optical channels;
         an arrayed waveguide grating (AWG) optically coupled to the array of lasers and configured to combine the laser light at different respective channel wavelengths; and
         a temperature control system configured to control temperature of both the array of lasers and the AWG with a same temperature control device; and
      a multi-channel receiver optical subassembly (ROSA) located in the transceiver housing, the ROSA being configured to receive a wavelength division multiplexed (WDM) optical signal on multiple channel wavelengths.

18. The optical line terminal of claim 17 wherein the AWG is supported above the array of lasers in the TOSA.

19. The optical line terminal of claim 17 wherein the temperature control system comprises:
   a laser array tray supporting the array of lasers and thermally coupled to the temperature control device; and
   an AWG tray supporting the AWG and thermally coupled to the temperature control device.

20. The optical line terminal of claim 17 wherein the temperature control system comprises a thermoelectric cooler as the same temperature control device.

* * * * *